(12) United States Patent
Jin et al.

(10) Patent No.: US 11,088,611 B2
(45) Date of Patent: Aug. 10, 2021

(54) POWER CONVERTER

(71) Applicant: Delta Electronics, Inc., Taoyuan (TW)

(72) Inventors: Da Jin, Taoyuan (TW); Yahong Xiong, Taoyuan (TW); Qinghua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 72 days.

(21) Appl. No.: 16/745,128

(22) Filed: Jan. 16, 2020

(65) Prior Publication Data

US 2020/0251979 A1 Aug. 6, 2020

(30) Foreign Application Priority Data

Jan. 31, 2019 (CN) .......................... 201910099551.0

(51) Int. Cl.
| | | |
|---|---|---|
| *H02M 1/08* | (2006.01) | |
| *H02M 1/088* | (2006.01) | |
| *H02M 3/335* | (2006.01) | |
| *H01F 27/24* | (2006.01) | |
| *H01F 27/28* | (2006.01) | |

(Continued)

(52) U.S. Cl.
CPC ............ *H02M 1/088* (2013.01); *H01F 27/24* (2013.01); *H01F 27/28* (2013.01); *H02M 3/06* (2013.01); *H02M 3/33576* (2013.01); *H02M 1/14* (2013.01)

(58) Field of Classification Search
CPC .......... H02M 1/08; H02M 1/14; H02M 1/088; H02M 1/096; H02M 3/06; H02M 3/33576; H01F 27/24; H01F 27/28
See application file for complete search history.

(56) References Cited

U.S. PATENT DOCUMENTS

| | | |
|---|---|---|
| 7,230,405 B2 | 6/2007 | Jang et al. |
| 8,829,866 B2 | 9/2014 | Lethellier |
| 9,306,458 B2 | 4/2016 | Khayat et al. |

(Continued)

FOREIGN PATENT DOCUMENTS

| | | |
|---|---|---|
| CN | 101990736 A | 3/2011 |
| CN | 203911763 U | 10/2014 |

(Continued)

*Primary Examiner* — Adolf D Berhane
(74) *Attorney, Agent, or Firm* — Kirton McConkie; Evan R. Witt

(57) ABSTRACT

A power converter includes a first positive terminal, a first negative terminal, a second positive terminal, a second negative terminal, a first capacitor and N phase conversion circuits. The first capacitor is connected between the second positive terminal and the second negative terminal. Each phase conversion circuit includes a first main switch, a second main switch, a second capacitor, a freewheeling switch, an inductor and a bridge arm circuit. The first main switch is electrically connected with the first positive terminal. The second capacitor is electrically connected with the first main switch and the second main switch. The freewheeling switch is electrically connected between the second main switch and the second negative terminal. The inductor is electrically connected with the second main switch. The second main switch is also electrically connected with the first main switch of an adjacent phase conversion circuit.

20 Claims, 9 Drawing Sheets

(51) Int. Cl.
*H02M 3/06* (2006.01)
*H02M 1/14* (2006.01)

(56) References Cited

U.S. PATENT DOCUMENTS

| | | |
|---|---|---|
| 9,331,578 B2 | 5/2016 | Cheng |
| 9,825,521 B2 | 11/2017 | Khayat |
| 10,033,276 B2 | 7/2018 | Shenoy |
| 2014/0103899 A1 | 4/2014 | Chen et al. |
| 2015/0002115 A1 | 1/2015 | Shenoy et al. |
| 2015/0015225 A1 | 1/2015 | Cheng |
| 2015/0311792 A1 | 10/2015 | Amaro et al. |
| 2015/0311793 A1 | 10/2015 | Khayat et al. |
| 2017/0163157 A1* | 6/2017 | Petersen ............ H02M 3/1582 |
| 2021/0083584 A1* | 3/2021 | Jin ....................... H02M 3/07 |
| 2021/0083658 A1* | 3/2021 | Jin ....................... H03K 17/08 |

FOREIGN PATENT DOCUMENTS

| | | |
|---|---|---|
| CN | 104283417 A | 1/2015 |
| CN | 204089593 U | 1/2015 |
| CN | 105720817 A | 6/2016 |
| CN | 106549577 A | 3/2017 |
| CN | 108683335 A | 10/2018 |
| CN | 108781038 A | 11/2018 |
| CN | 109004832 A | 12/2018 |

\* cited by examiner

US 11,088,611 B2

POWER CONVERTER

FIELD OF THE INVENTION

The present disclosure relates to a converter, and more particularly to a power converter.

BACKGROUND OF THE INVENTION

With the rapid development of Internet and artificial intelligence, the demands on the power sources with high efficiency and high power density are increasing. For example, the power level of the single board has been increased to 600 W~3 kW, and the power level of the rack has been increased to more than 18 kW. For reducing the bus loss and cost, the bus voltage is gradually increased from 12V to 54V.

As mentioned above, the voltage received from the bus is increased from the 12V to 54V. After a system board receives the input voltage of 54V, a power converter is used to decrease the magnitude of the input voltage to an output voltage with a set voltage value (e.g., 12V). Then, the magnitude of the output voltage is further decreased from 12V to 1.8V or 1.2V through another device or circuit in order to power the back-end electronic components.

However, since the input voltage received by the power converter has a wide voltage range and fluctuates between 40V and 54V, some drawbacks occur. For example, if the input voltage received from the bus is subjected to a change, the magnitude of the output voltage from the power converter cannot be maintained at the set voltage value (i.e., 12V). Since the magnitude of the output voltage from the power converter is insufficient, the back-end electronic components cannot be driven successfully.

Therefore, there is a need of providing an improved power converter in order to overcome the drawbacks of the conventional technologies.

SUMMARY OF THE INVENTION

An object of the present disclosure provides a power converter capable of maintaining the magnitude of the output voltage at the set voltage value when the received input voltage has a wide voltage range.

Another object of the present disclosure provides a power converter with enhanced power conversion efficiency.

A further object of the present disclosure provides a power converter capable of soft-starting the output voltage when the duty cycle of the main switch of each phase conversion circuit is fixed.

In accordance with an aspect of the present disclosure, a power converter is provided. The power converter includes a first positive terminal, a first negative terminal, a second positive terminal, a second negative terminal, a first capacitor, N phase conversion circuits in cascade connection, and a control circuit. N is a positive integer equal to or greater than 2. The second negative terminal is connected with the first negative terminal. A first terminal of the first capacitor is electrically connected with the second positive terminal. A second terminal of the first capacitor is electrically connected with the second negative terminal. Each of the N phase conversion circuits includes a first main switch, a second main switch, a second capacitor, a freewheeling switch, an inductor and a bridge arm circuit. A first terminal of the first main switch is electrically connected with the first positive terminal. A first terminal of the second capacitor is electrically connected with a second terminal of the first main switch. A second terminal of the second capacitor is electrically connected with a second terminal of the second main switch. The freewheeling switch is electrically connected between the second terminal of the second main switch and the second terminal of the first capacitor. A first terminal of the inductor is electrically connected with the second terminal of the second main switch. The bridge arm circuit is electrically connected between the first capacitor and the inductor. The bridge arm circuit includes an upper arm switch and a lower arm switch. The upper arm switch is electrically connected between a second terminal of the inductor and the first terminal of the first capacitor. The lower arm switch is electrically connected between the second terminal of the inductor and the second terminal of the first capacitor. The control circuit is used for controlling operations of the first main switch, the second main switch, the freewheeling switch and the bridge arm circuit of each phase conversion circuit. A first terminal of the second main switch of each phase conversion circuit is electrically connected with the second terminal of the first main switch of an adjacent phase conversion circuit of the N phase conversion circuits.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
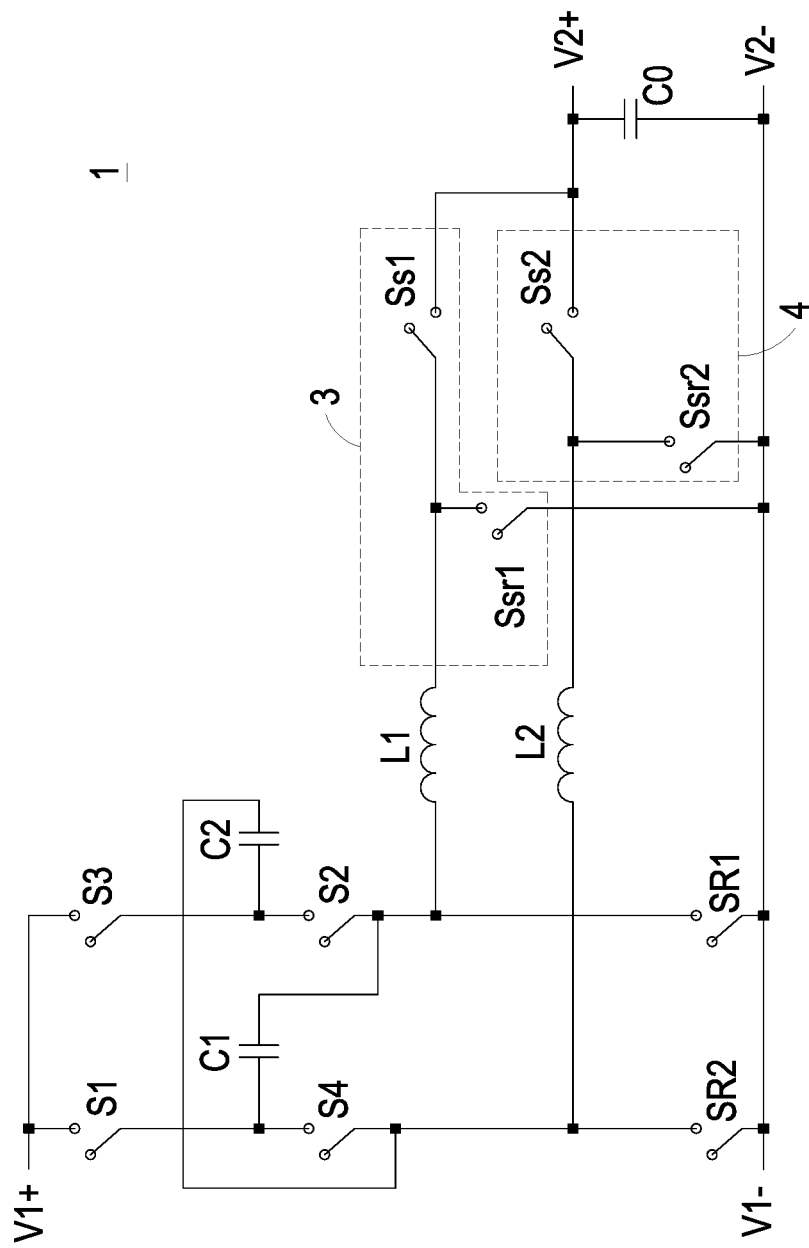
FIG. 1 is a schematic circuit diagram illustrating a power converter according to a first embodiment of the present disclosure.
Figure 2:
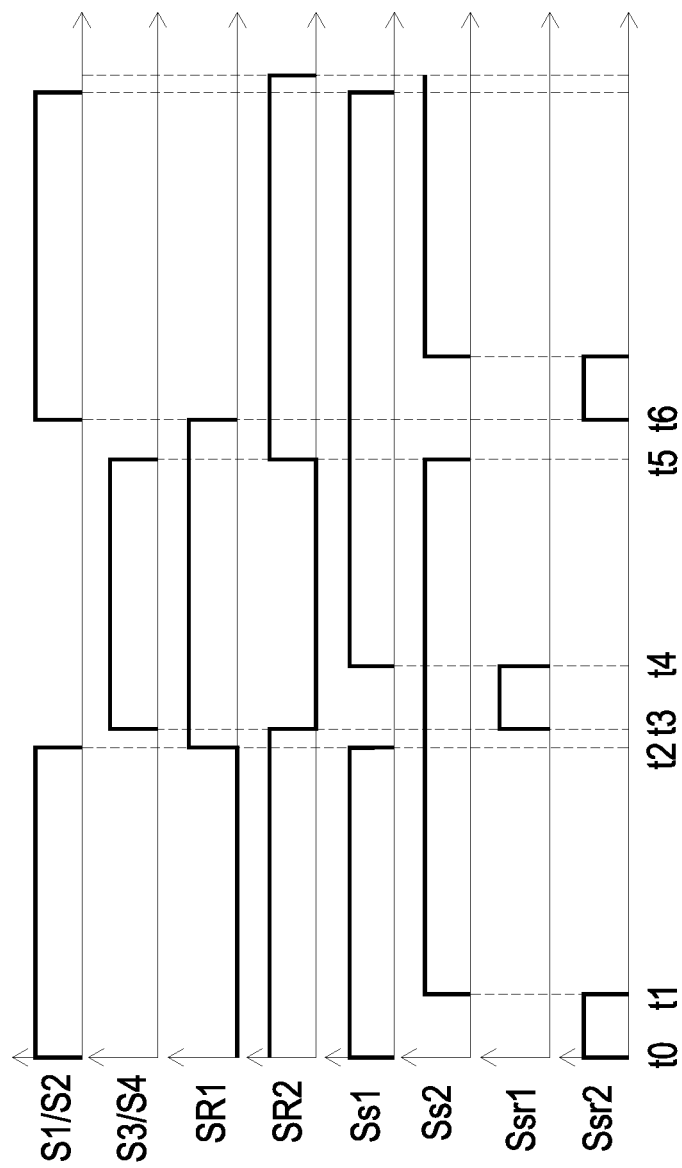
FIG. 2 is a schematic waveform diagram illustrating the operation states of associated switches of the power converter according to the first embodiment of the present disclosure.

Please refer to FIGS. 1 and 2. FIG. 1 is a schematic circuit diagram illustrating a power converter according to a first embodiment of the present disclosure. FIG. 2 is a schematic waveform diagram illustrating the operation states of associated switches of the power converter according to the first embodiment of the present disclosure.

Figure 3:
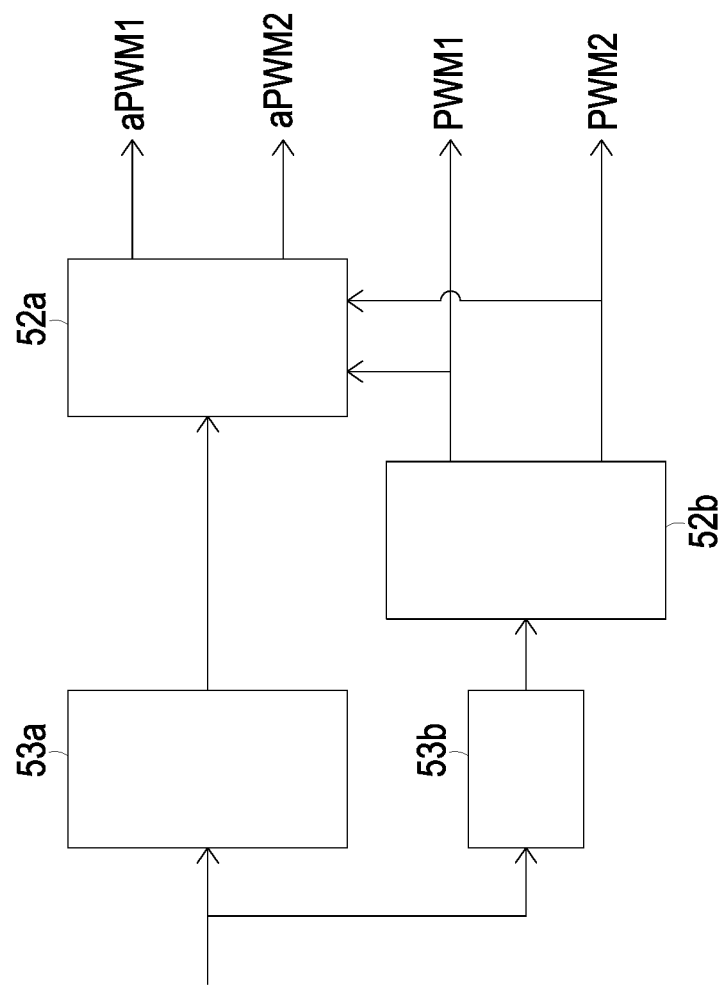
FIG. 3 is a schematic circuit diagram illustrating the control circuit of the power converter according to the first embodiment of the present disclosure.

As shown in FIG. 1, the power converter 1 comprises a first positive terminal V1+, a first negative terminal V1−, a second positive terminal V2+, a second negative terminal V2−, a first capacitor C0, a plurality of phase conversion circuits in cascade connection, and a control circuit 2 (see FIG. 3). A first terminal of the first capacitor C0 is electrically connected with the second positive terminal V2+. A second terminal of the first capacitor C0 is electrically connected with the second negative terminal V2−.

In some embodiments, the input side of the power converter 1 comprises the first positive terminal V1+ and the first negative terminal V1−. The output side of the power converter 1 comprises the second positive terminal V2+ and the second negative terminal V2−. Since the first negative terminal V1− and the second negative terminal V2− are electrically connected with each other, the first negative terminal V1− and the second negative terminal V2− have the same electric potential. Moreover, the input voltage received by the input side of the power converter 1 has a wide voltage range. That is, the magnitude of the input voltage fluctuates within a specified range. The output voltage from the output side of the power converter 1 has a fixed voltage value.

In the embodiment of FIG. 1, the power converter 1 comprises two phase conversation circuits. It is noted that the number of the plurality of phase conversion circuits is not restricted. For example, in another embodiment, the power converter comprises three phase conversation circuits or more than three phase conversation circuits (e.g., four phase conversation circuits of FIG. 8). The gain value of the power converter 1 (i.e. the ratio of the output voltage to the input voltage) is dependent on the number of the phase conversation circuits. The circuitry structures and operations of the plurality of phase conversation circuits are similar.

Please refer to FIG. 1. The power converter 1 comprises a first phase conversion circuit and a second phase conversion circuit. The first phase conversion circuit comprises a first main switch S1, a second main switch S2, a second capacitor C1, a freewheeling switch SR1 an inductor L1 and a bridge arm circuit 3. A first terminal of the first main switch S1 is electrically connected with the first positive terminal V1+. A first terminal of the second capacitor C1 is electrically connected with a second terminal of the first main switch S1. A second terminal of the second capacitor C1 is electrically connected with a second terminal of the second main switch S2. The freewheeling switch SR1 is electrically connected between the second terminal of the second main switch S2 and the second terminal of the first capacitor C0.

A first terminal of the inductor L1 is electrically connected with the second terminal of the second main switch S2. A second terminal of the inductor L1 is electrically connected with the bridge arm circuit 3. The bridge arm circuit 3 is electrically connected between the second terminal of the inductor L1 and the first capacitor C0. The bridge arm circuit 3 comprises an upper arm switch Ss1 and a lower arm switch Ssr1. The upper arm switch Ss1 is electrically connected between the second terminal of the inductor L1 and the first terminal of the first capacitor C0. The lower arm switch Ssr1 is electrically connected between the second terminal of the inductor L1 and the second terminal of the first capacitor C0.

The circuitry structure of the second phase conversion circuit is similar to that of the first phase conversion circuit. As shown in FIG. 1, the second phase conversion circuit comprises a first main switch S3, a second main switch S4, a second capacitor C2, a freewheeling switch SR2, an inductor L2 and a bridge arm circuit 4. A first terminal of the first main switch S3 is electrically connected with the first positive terminal V1+. A first terminal of the second capacitor C2 is electrically connected with a second terminal of the first main switch S3. A second terminal of the second capacitor C2 is electrically connected with a second terminal of the second main switch S4. The freewheeling switch SR2 is electrically connected between the second terminal of the second main switch S4 and the second terminal of the first capacitor C0. A first terminal of the inductor L2 is electrically connected with the second terminal of the second main switch S4. A second terminal of the inductor L2 is electrically connected with the bridge arm circuit 4. The bridge arm circuit 4 is electrically connected between the second terminal of the inductor L2 and the first capacitor C0. The bridge arm circuit 4 comprises an upper arm switch Ss2 and a lower arm switch Ssr2. The upper arm switch Ss2 is electrically connected between the second terminal of the inductor L2 and the first terminal of the first capacitor C0. The lower arm switch Ssr2 is electrically connected between the second terminal of the inductor L2 and the second terminal of the first capacitor C0.

The first terminal of the second main switch S2 of the first phase conversion circuit is connected with the second terminal of the first main switch S3 of the second phase conversion circuit. The first terminal of the second main switch S4 of the second phase conversion circuit is connected with the second terminal of the first main switch S1 of the first phase conversion circuit. A first boost circuit is defined by the inductor L1 and the bridge arm circuit 3 of the first phase conversion circuit collaboratively. A second boost circuit is defined by the inductor L2 and the bridge arm circuit 4 of the second phase conversion circuit collaboratively. In case that the input voltage received by the power converter 1 declines and the output voltage from the power converter 1 is unable to be maintained at the set voltage value, the output voltage is increased by the first boost circuit and the second boost circuit. Consequently, after the input voltage declines, the output voltage is maintained at the set voltage value within a holding time period.

As mentioned above, the input side of the power converter 1 comprises the first positive terminal V1+ and the first negative terminal V1−, and the output side of the power converter 1 comprises the second positive terminal V2+ and the second negative terminal V2−. In this embodiment, the duty cycles of the first main switch and the second main switch of each phase conversion circuit are adjustable. That is, the duty cycles of the first main switch S1 and the second main switch S2 of the first phase conversion circuit are adjustable, and the duty cycles of the first main switch S3 and the second main switch S4 of the second phase conversion circuit are adjustable.

The control circuit 2 is used for controlling the operations of the first main switch S1, the second main switch S2, the freewheeling switch SR1 and the bridge arm circuit 3 of the first phase conversion circuit and controlling the operations of the first main switch S3, the second main switch S4, the freewheeling switch SR2 and the bridge arm circuit 4 of the second phase conversion circuit.

The operations of the power converter 1 of the first embodiment will be described as follows. The operations of the two phase conversion circuits may be expanded to the operations of three phase conversion circuits or more than three phase conversion circuits, and are not redundantly described herein.

As shown in FIG. 2, the time interval between t0 and t6 is one switching period. In each switching period, the control circuit 2 controls the on/off states of all switches in the phase conversion circuits according to the detected output voltage. For example, the on/off states of the first main switch S1 of the first phase conversion circuit are identical to the on/off states of the second main switch S2 of the first phase conversion circuit. Similarly, the on/off states of the first main switch S3 of the second phase conversion circuit are identical to the on/off states of the second main switch S4 of the second phase conversion circuit. The on/off states of the freewheeling switch SR1 of the first phase conversion circuit are complementary to the on/off states of the corresponding first main switch S1 and the corresponding second main switch S2. The on/off states of the freewheeling switch SR2 of the second phase conversion circuit are complementary to the on/off states of the corresponding first main switch S3 and the corresponding second main switch S4. The on/off states of the upper arm switch Ss1 of the first phase conversion circuit are complementary to the on/off states of the corresponding lower arm switch Ssr1. The on/off states of the upper arm switch Ss2 of the second phase conversion circuit are complementary to the on/off states of the corresponding lower arm switch Ssr2.

The lower arm switch Ssr2 of the second phase conversion circuit is conducted synchronously with the first main switch S1 and the second main switch S2 of the first phase conversion circuit. The lower arm switch Ssr1 of the second phase conversion circuit is conducted synchronously with the first main switch S3 and the second main switch S4 of the second phase conversion circuit.

In the embodiment, that the switches are synchronously conducted means that the switches are conducted at the time points among every two of which a fixed delay exist. The fixed delay between the turning on time point of the switches can be referred to as a conduction angle. In this embodiment, the conduction angle is in the range between 0 degree and 360 degree. For example, the conduction angle is 0 degree.

The phase difference between the driving signal of the main switch S1/S2 and the driving signal of the main switch S3/S4 is 180 degree. Moreover, there is a dead time between the driving signal of the main switch S1/S2 and the driving signal of the main switch S3/S4. For example, the power converter 1 comprises N phase conversion circuits, wherein N is a positive integer equal to or greater than 2. If the magnitude of the output voltage from the power converter 1 is equal to the set voltage value and the duty cycles of the first main switch and the second main switch of each phase conversion circuit are lower than (100/N) %, the upper arm switches of the N phase conversion circuits are in the normally on state and the lower arm switches of the N phase conversion circuits are in the normally off state under control of the control circuit 2. For example, the power converter 1 comprises two phase conversion circuits (i.e. N=2). If the magnitude of the output voltage from the power converter 1 is equal to the set voltage value and the duty cycles of the first main switch and the second main switch of each phase conversion circuit are lower than 50%, the upper arm switches Ss1 and Ss2 are in the normally on state and the lower arm switches Ssr1 and Ssr2 are in the normally off state under control of the control circuit 2.

If the magnitude of the output voltage from the power converter 1 is lower than the set voltage value and the duty cycles of the first main switch and the second main switch of each phase conversion circuit are equal to or close to (100/N) %, the upper arm switches of the N phase conversion circuits are ejected from the normally on state and the lower arm switches of the N phase conversion circuits are ejected from the normally off state under control of the control circuit 2. For example, the power converter 1 comprises two phase conversion circuits (i.e. N=2). If the magnitude of the output voltage from the power converter 1 is lower than the set voltage value and the duty cycles of the first main switch and the second main switch of each phase conversion circuit are equal to or close to 50%, the upper arm switches Ss1 and Ss2 are ejected from the normally on state and the lower arm switches Ssr1 and Ssr2 are ejected from the normally off state under control of the control circuit 2. Consequently, the magnitude of the output voltage from the power converter 1 is increased and maintained at the set voltage value. In this embodiment, the duty cycles of the lower arm switches Ssr1 and Ssr2 are identical, and the phase difference between the driving signals of the lower arm switches Ssr1 and Ssr2 is 180 degree.

For example, the power converter 1 comprises two phase conversion circuits (i.e. N=2). In case that the magnitude of the input voltage received by the power converter 1 is high enough, the magnitude of the output voltage is maintained at the set voltage value. If the duty cycles of the first main switch and the second main switch of each phase conversion circuit are lower than 50%, the upper arm switches Ss1 and Ss2 are in the normally on state and the lower arm switches Ssr1 and Ssr2 are in the normally off state under control of the control circuit 2. In case that the magnitude of the input voltage received by the power converter 1 declines, the magnitude of the output voltage cannot be maintained at the set voltage value. If the duty cycles of the first main switch and the second main switch of each phase conversion circuit are equal to or close to 50%, the upper arm switches Ss1 and Ss2 are ejected from the normally on state and the lower arm switches Ssr1 and Ssr2 are ejected from the normally off state under control of the control circuit 2. Under this circumstance, the first boost circuit is defined by the inductor L1 and the bridge arm circuit 3 of the first phase conversion circuit collaboratively, and the second boost circuit is defined by the inductor L2 and the bridge arm circuit 4 of the second phase conversion circuit collaboratively. The output voltage is increased by the first boost circuit and the second boost circuit. Consequently, after the input voltage declines, the output voltage is maintained at the set voltage value within the holding time period.

In an embodiment, the magnitude of the input voltage of the power converter 1 fluctuates within the range between 40V and 54V, and the magnitude of the output voltage in maintained at the set voltage value (e.g., 12V). The duty cycles of the first main switch and the second main switch of each phase conversion circuit are D1. The duty cycle of the upper arm switch of each phase conversion circuit is D2.

The gain value (i.e., the output voltage to the input voltage) of the power converter 1 is equal to D1/(N×D2), wherein N is the number of the phase conversion circuits.

In an embodiment, the first main switch S1, S3, the second main switch S2, S4, the freewheeling switch SR1, SR2, the upper arm switch Ss1, Ss2 and the lower arm switch Ssr1, Ssr2 of each phase conversion circuit are metal-oxide-semiconductor field-effect transistors (MOSFET), Silicon Carbide (SiC) switches or gallium nitride (GaN) switches. Alternatively, the freewheeling switch SRL SR2 and the lower arm switch Ssr1, Ssr2 of each phase conversion circuit are diodes.

FIG. 3 is a schematic circuit diagram illustrating the control circuit of the power converter according to the first embodiment of the present disclosure. In this embodiment, the control circuit 2 comprises a first pulse width modulation circuit 52a, a second pulse width modulation circuit 52b, a first computation amplifier 53a and a second computation amplifier 53b. According to the output voltage from the power converter 1, the second computation amplifier 53b generates a second error amplification signal. According to the second error amplification signal, the second pulse width modulation circuit 52b generates two pulse width modulation signals PWM1 and PWM2. The duty cycles of the pulse width modulation signals PWM1 and PWM2 are D1. The phase difference between the pulse width modulation signals PWM1 and PWM2 is 180 degree. The maximum duty cycles of the pulse width modulation signals PWM1 and PWM2 are 50%. According to the pulse width modulation signal PWM1, a corresponding driving circuit (not shown) generates a driving signal to control the first main switch S1, the second main switch S2 and the freewheeling switch SR1 of the first phase conversion circuit. According to the width modulation signal PWM2, a corresponding driving circuit (not shown) generates a driving signal to control the first main switch S3, the second main switch S4 and the freewheeling switch SR2 of the second phase conversion circuit.

According to the output voltage from the power converter 1, the first computation amplifier 53a generates a first error amplification signal. In case that the duty cycles of the pulse width modulation signals PWM1 and PWM2 reach the maximum value (i.e., 50%), the first pulse width modulation circuit 52a generates pulse width modulation signals aPWM1 and aPWM2 according to the first error amplification signal and the pulse width modulation signals PWM1 and PWM2. The on/off states of the upper arm switch Ss1 and the lower arm switch Ssr1 of the first phase conversion circuit are controlled according to the pulse width modulation signal aPWM1. The on/off states of the upper arm switch Ss2 and the lower arm switch Ssr2 of the second phase conversion circuit are controlled according to the pulse width modulation signal aPWM2.

Figure 4:
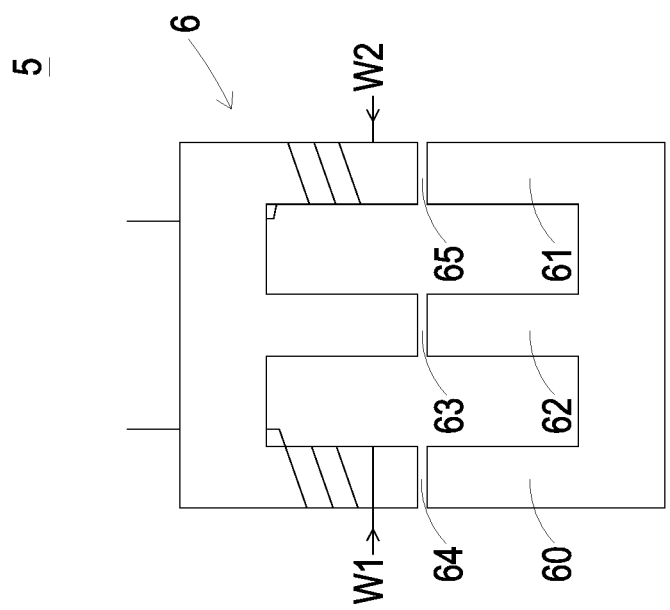
FIG. 4 is a schematic structure of a first exemplary magnetic module for defining the inductors L1 and L2 of the power converter according to the first embodiment of the present disclosure.

FIG. 4 is a schematic structure of a first exemplary magnetic module for defining the inductors L1 and L2 of the power converter according to the first embodiment of the present disclosure. As mentioned above, the phase difference between the driving signal of the main switch S1/S2 of the first phase conversion circuit and the driving signal of the main switch S3/S4 of the second phase conversion circuit is 180 degree. Consequently, the inductor L1 of the first phase conversion circuit and the inductor L2 of the second phase conversion circuit are coupled together as a magnetic module according to a magnetic integration technology. As shown FIG. 4, the power converter 1 further comprises a magnetic module 5. The magnetic module 5 comprises a magnetic core 6, a first winding assembly W1 and a second winding assembly W2. The magnetic core 6 comprises a first lateral leg 60, a second lateral leg 61 and a middle leg 62. The middle leg 62 is arranged between the first lateral leg 60 and the second lateral leg 61. The middle leg 62 has an air gap 63. In this embodiment, the first lateral leg 60 and the second lateral leg 61 have no air gaps. The first winding assembly W1 is wound around the first lateral leg 60. Consequently, the inductor L1 of the first phase conversion circuit is defined by the first winding assembly W1 and the magnetic core 6 collaboratively. The second winding assembly W2 is wound around the second lateral leg 61. Consequently, the inductor L2 of the second phase conversion circuit is defined by the second winding assembly W2 and the magnetic core 6 collaboratively. Due to the structure of the magnetic module 5, the DC magnetic fluxes of the middle leg 62 are superimposed, the AC magnetic fluxes are offset, and the ripple currents of the winding assemblies are reduced. In case that the duty cycles of the first main switch and the second main switch of each phase conversion circuit are 50%, the currents flowing through the first winding assembly W1 and the second winding assembly W2 have no ripples.

Figure 5:
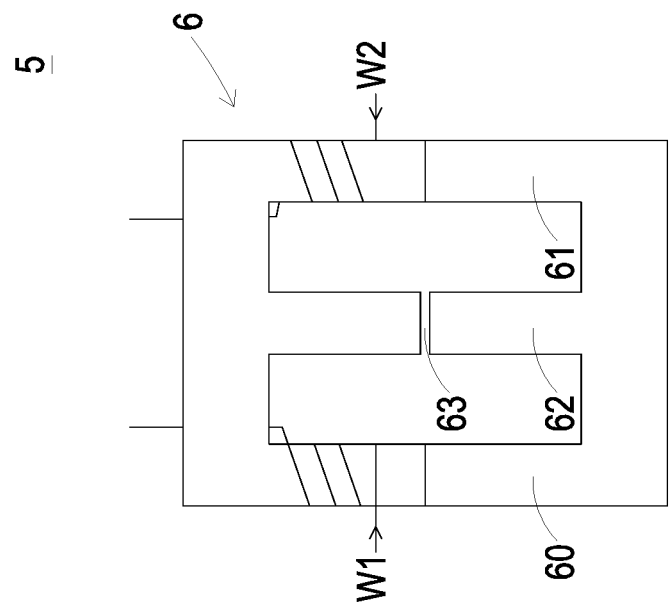
FIG. 5 is a schematic structure of a second exemplary magnetic module for defining the inductors L1 and L2 of the power converter according to the first embodiment of the present disclosure.

FIG. 5 is a schematic structure of a second exemplary magnetic module for defining the inductors L1 and L2 of the power converter according to the first embodiment of the present disclosure. In comparison with the FIG. 4, the first lateral leg 60 has an air gap 64, and the second lateral leg 61 has an air gap 65. For example, the length of the air gap 64 and the length of the air gap 65 are equal to each other, and shorter than or equal to the length of the air gap 63. Alternatively, the length of the air gap 64 and the length of the air gap 65 are close to zero. Consequently, the ripples of the currents flowing through the first winding assembly W1 and the second winding assembly W2 are reduced. Moreover, since the process of forming the air gaps is simplified, the magnetic module 5 can be assembled more easily.

Figure 6:
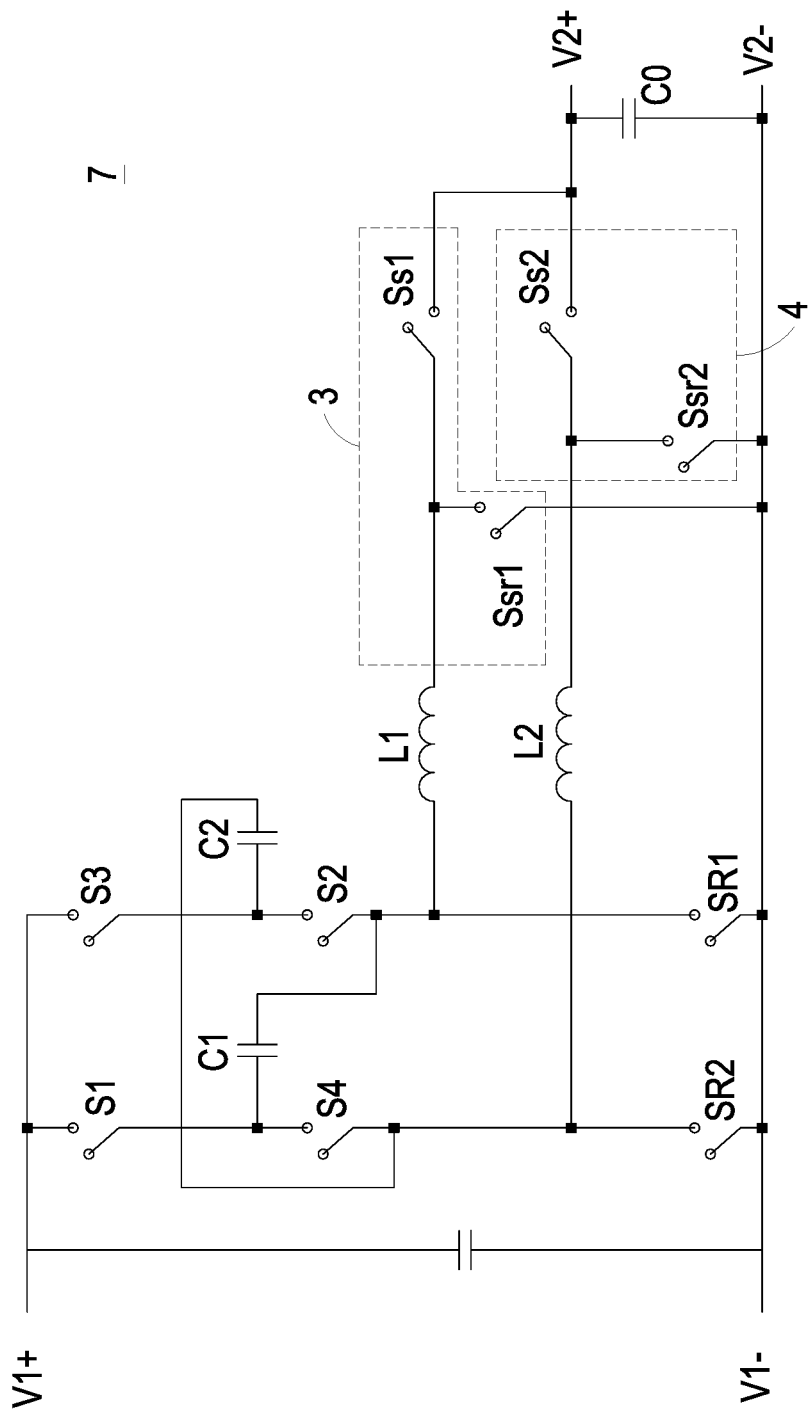
FIG. 6 is a schematic circuit diagram illustrating a power converter according to a second embodiment of the present disclosure.
Figure 7:
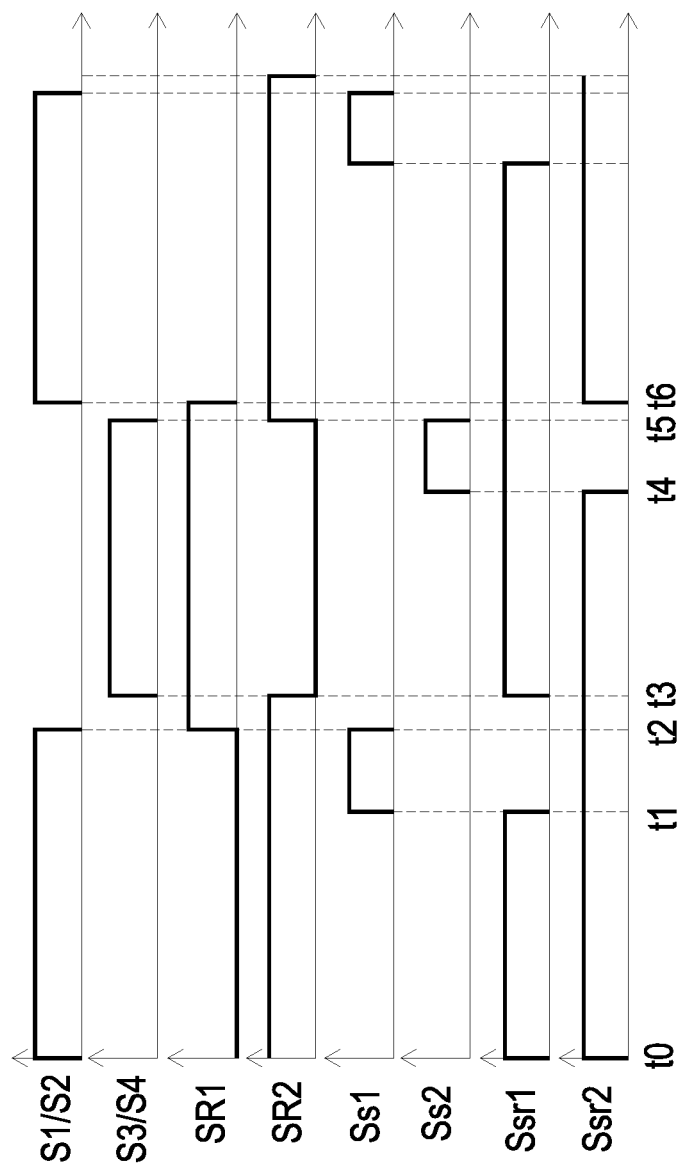
FIG. 7 is a schematic waveform diagram illustrating the operation states of associated switches of the power converter according to the second embodiment of the present disclosure.

Please refer to FIGS. 6 and 7. FIG. 6 is a schematic circuit diagram illustrating a power converter according to a second embodiment of the present disclosure. FIG. 7 is a schematic waveform diagram illustrating the operation states of associated switches of the power converter according to the second embodiment of the present disclosure. Component parts and elements corresponding to those of the first embodiment are designated by identical numeral references, and detailed descriptions thereof are omitted. In comparison with the first embodiment, the output side of the power converter 7 comprises the first positive terminal V1+ and the first negative terminal V1−, and the input side of the power converter 1 comprises the second positive terminal V2+ and the second negative terminal V2−. Moreover, the input voltage received by the input side of the power converter 7 has a wide voltage range. That is, the magnitude of the input voltage fluctuates within a specified range. The output voltage from the output side of the power converter 7 has a fixed voltage value. Similarly, the duty cycles of the first main switch S1 and the second main switch S2 of the first phase conversion circuit are adjustable, and the duty cycles of the first main switch S3 and the second main switch S4 of the second phase conversion circuit are adjustable.

In this embodiment, a first buck circuit is defined by the inductor L1 and the bridge arm circuit 3 of the first phase conversion circuit collaboratively, and a second buck circuit is defined by the inductor L2 and the bridge arm circuit 4 of the second phase conversion circuit collaboratively. Due to the first buck circuit and the second buck circuit, the function of soft-starting the output voltage of the power converter 7 is achieved.

In case that the input voltage of the power converter 7 is too high, the magnitude of the output voltage may exceed the set voltage value. If the duty cycles of the first main switch and the second main switch of each phase conversion circuit are equal to or close to the maximum value (e.g., 50%), the upper arm switches Ss1 and Ss2 are ejected from the normally on state and the lower arm switches Ssr1 and Ssr2 are ejected from the normally off state under control of the control circuit 2. That is, the upper arm switches Ss1 and Ss2 are switched to the off state, and the lower arm switches Ssr1 and Ssr2 are switched to the on state. Consequently, the magnitude of the output voltage is maintained at the fixed set voltage value.

As shown in FIG. 7, the time interval between t0 and t6 is one switching period. In each switching period, the control circuit 2 controls the on/off states of all switches in the phase conversion circuits according to the detected output voltage. For example, the on/off states of the first main switch S1 of the first phase conversion circuit are identical to the on/off states of the second main switch S2 of the first phase conversion circuit. Similarly, the on/off states of the first main switch S3 of the second phase conversion circuit are identical to the on/off states of the second main switch S4 of the second phase conversion circuit. The on/off states of the freewheeling switch SR1 of the first phase conversion circuit are complementary to the on/off states of the corresponding first main switch S1 and the corresponding second main switch S2. The on/off states of the freewheeling switch SR2 of the second phase conversion circuit are complementary to the on/off states of the corresponding first main switch S3 and the corresponding second main switch S4. The on/off states of the upper arm switch Ss1 of the first phase conversion circuit are complementary to the on/off states of the corresponding lower arm switch Ssr1. The on/off states of the upper arm switch Ss2 of the second phase conversion circuit are complementary to the on/off states of the corresponding lower arm switch Ssr2.

The phase difference between the driving signal of the main switch S1/S2 and the driving signal of the main switch S3/S4 is 180 degree. Moreover, there is a dead time between the driving signal of the main switch S1/S2 and the driving signal of the main switch S3/S4. In case that the output voltage of the power converter 7 is started, the magnitude of the output voltage is lower than the set voltage value. According to the detected output voltage from the power converter 7, the duty cycles of the first main switch and the second main switch of each phase conversion circuit are equal to or close to 50% under control of the control circuit 2. In addition, the duty cycles of the upper arm switches Ss1 and Ss2 within the switching period are gradually increased. Consequently, the function of soft-starting the output voltage of the power converter 7 is achieved.

The lower arm switch Ssr2 of the second phase conversion circuit is conducted synchronously with the first main switch S1 and the second main switch S2 of the first phase conversion circuit. The lower arm switch Ssr1 of the second phase conversion circuit is conducted synchronously with the first main switch S3 and the second main switch S4 of the second phase conversion circuit. The conduction angle is in the range between 0 degree and 360 degree. For example, the conduction angle is 0 degree.

After the process of soft-starting the output voltage of the power converter 7 is completed, the magnitude of the output voltage is equal to the fixed set voltage value. If the duty cycles of the first main switch and the second main switch of each phase conversion circuit are lower than 50%, the upper arm switches Ss1 and Ss2 are in the normally on state and the lower arm switches Ssr1 and Ssr2 are in the normally off state under control of the control circuit 2. Moreover, the duty cycles of the first main switch and the second main switch of each phase conversion circuit are adjusted according to the detected output voltage under control of the control circuit 2. The other operations of the power converter 7 are similar to those of the first embodiment, and are not redundantly described herein.

In case that the input voltage of the power converter 7 is too high, the magnitude of the output voltage may exceed the set voltage value. If the duty cycles of the first main switch and the second main switch of each phase conversion circuit are equal to or close to the maximum value (e.g., 50%), the upper arm switches Ss1 and Ss2 are ejected from the normally on state and the lower arm switches Ssr1 and Ssr2 are ejected from the normally off state under control of the control circuit 2. That is, the upper arm switches Ss1 and Ss2 are switched to the off state, and the lower arm switches Ssr1 and Ssr2 are switched to the on state. Consequently, the magnitude of the output voltage is maintained at the fixed set voltage value.

As mentioned above, the duty cycles of the first main switch S1 and the second main switch S2 of the first phase conversion circuit and the duty cycles of the first main switch S3 and the second main switch S4 of the second phase conversion circuit are equal to or close to 50%. The duty cycles of the upper arm switches Ss1 and Ss2 within the switching period are gradually increased under control of the control circuit 2. Consequently, the function of soft-starting the output voltage of the power converter 7 is achieved. In case that the input voltage of the power converter 7 is too high, the magnitude of the output voltage may exceed the set voltage value. If the duty cycles of the first main switch and the second main switch of each phase conversion circuit are equal to or close to the maximum value (e.g., 50%), the upper arm switch of each phase conversion circuit is ejected from the normally on state and the lower arm switch of each phase conversion circuit is ejected from the normally off state under control of the control circuit 2. That is, the upper arm switch of each phase conversion circuit is switched to the off state, and the lower arm switch of each phase conversion circuit is switched to the on state. Consequently, the magnitude of the output voltage is maintained at the fixed set voltage value.

In an embodiment, the magnitude of the input voltage of the power converter 7 is 12V, and the magnitude of the output voltage from the power converter 7 is 48V.

In some other embodiments, the power converter comprises three phase conversion circuits or more than three phase conversion circuits (e.g., four phase conversion circuits).

Figure 8:
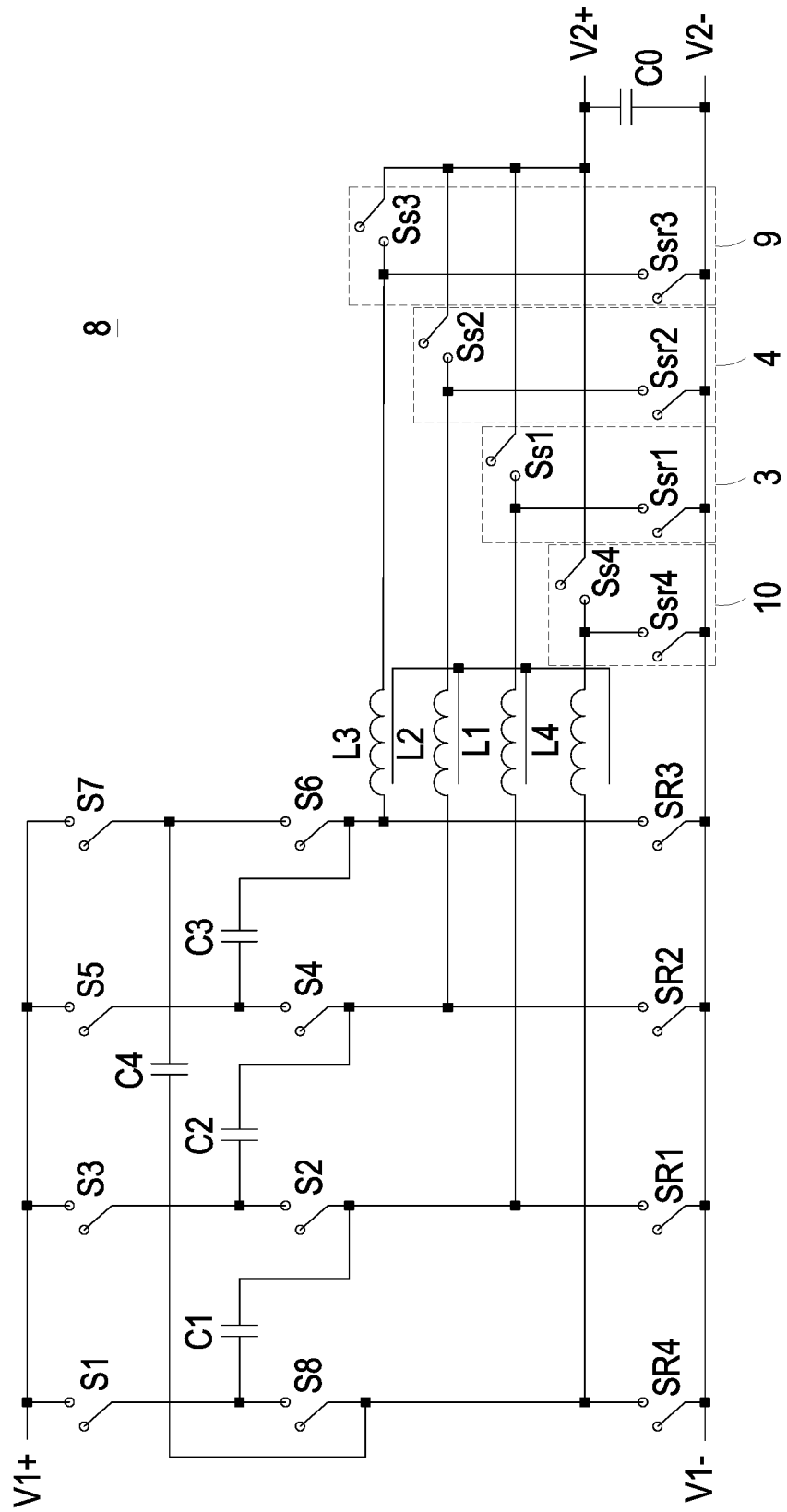
FIG. 8 is a schematic circuit diagram illustrating a power converter according to a third embodiment of the present disclosure.

FIG. 8 is a schematic circuit diagram illustrating a power converter according to a third embodiment of the present disclosure. In this embodiment, the power converter 8 comprises four phase conversion circuits. The operations of each phase conversion circuit are similar to those of each of the two phase conversion circuits of the first embodiment.

Please refer to FIG. 8. The first phase conversion circuit comprises a first main switch S1, a second main switch S2, a second capacitor C1, a freewheeling switch SR1, an inductor L1 and a bridge arm circuit 3. The second phase conversion circuit comprises a first main switch S3, a second main switch S4, a second capacitor C2, a freewheeling switch SR2, an inductor L2 and a bridge arm circuit 4. The circuitry structures of the first phase conversion circuit and the second phase conversion circuit are similar to those of the first embodiment, and are not redundantly described herein.

The third phase conversion circuit comprises a first main switch S5, a second main switch S6, a second capacitor C3, a freewheeling switch SR3, an inductor L3 and a bridge arm circuit 9. A first terminal of the first main switch S5 is electrically connected with the first positive terminal V1+. A first terminal of the second capacitor C3 is electrically connected with a second terminal of the first main switch S5. A second terminal of the second capacitor C3 is electrically connected with a second terminal of the second main switch S6. The freewheeling switch SR3 is electrically connected between the second terminal of the second main switch S6 and the second terminal of the first capacitor C0. A first terminal of the inductor L3 is electrically connected with the second terminal of the second main switch S6. A second terminal of the inductor L3 is electrically connected with the bridge arm circuit 9. The bridge arm circuit 9 is electrically connected between the second terminal of the inductor L3 and the first capacitor C0. The bridge arm circuit 9 comprises an upper arm switch Ss3 and a lower arm switch Ssr3. The upper arm switch Ss3 is electrically connected between the second terminal of the inductor L3 and the first terminal of the first capacitor C0. The lower arm switch Ssr3 is electrically connected between the second terminal of the inductor L3 and the second terminal of the first capacitor C0.

The circuitry structure of the fourth phase conversion circuit is similar to that of the third phase conversion circuit. The fourth phase conversion circuit comprises a first main switch S7, a second main switch S8, a second capacitor C4, a freewheeling switch SR4, an inductor L4 and a bridge arm circuit 10. A first terminal of the first main switch S7 is electrically connected with the first positive terminal V1+. A first terminal of the second capacitor C4 is electrically connected with a second terminal of the first main switch S7. A second terminal of the second capacitor C4 is electrically connected with a second terminal of the second main switch S8. The freewheeling switch SR4 is electrically connected between the second terminal of the second main switch S8 and the second terminal of the first capacitor C0. A first terminal of the inductor L4 is electrically connected with the second terminal of the second main switch S8. A second terminal of the inductor L4 is electrically connected with the bridge arm circuit 10. The bridge arm circuit 10 is electrically connected between the second terminal of the inductor L4 and the first capacitor C0. The bridge arm circuit 10 comprises an upper arm switch Ss4 and a lower arm switch Ssr4. The upper arm switch Ss4 is electrically connected between the second terminal of the inductor L4 and the first terminal of the first capacitor C0. The lower arm switch Ssr4 is electrically connected between the second terminal of the inductor L4 and the second terminal of the first capacitor C0.

The first terminal of the second main switch S2 of the first phase conversion circuit is connected with the second terminal of the first main switch S3 of the second phase conversion circuit. The first terminal of the second main switch S4 of the second phase conversion circuit is connected with the second terminal of the first main switch S5 of the third phase conversion circuit. The first terminal of the second main switch S6 of the third phase conversion circuit is connected with the second terminal of the first main switch S7 of the fourth phase conversion circuit. The first terminal of the second main switch S8 of the fourth phase conversion circuit is connected with the second terminal of the first main switch S1 of the first phase conversion circuit.

In this embodiment, the input side of the power converter 8 comprises the first positive terminal V1+ and the first negative terminal V1−, and the output side of the power converter 8 comprises the second positive terminal V2+ and the second negative terminal V2−. The magnitude of the input voltage is in the range between 40V and 64V. The magnitude of the output voltage is in the range between 5V and 6V. Alternatively, the output side of the power converter 8 comprises the first positive terminal V1+ and the first negative terminal V1−, and the input side of the power converter 8 comprises the second positive terminal V2+ and the second negative terminal V2−.

In this embodiment, the maximum duty cycle D1 of each main switch of each phase conversion circuit is ¼. The phase difference between the driving signal of the first main switch S1 of the first phase conversion circuit and the driving signal of the first main switch S3 of the second phase conversion circuit is 90 degree. The phase difference between the driving signal of the first main switch S3 of the second phase conversion circuit and the driving signal of the first main switch S5 of the third phase conversion circuit is 90 degree. The phase difference between the driving signal of the first main switch S5 of the third phase conversion circuit and the driving signal of the first main switch S7 of the fourth phase conversion circuit is 90 degree. The phase difference between the driving signal of the first main switch S7 of the fourth phase conversion circuit and the driving signal of the first main switch S1 of the first phase conversion circuit is 90 degree. Moreover, the first main switch and the second main switch of each phase conversion circuit are controlled in phase. The upper arm switch of each phase conversion circuit is conducted synchronously with the first main switch and the second main switch of the corresponding phase conversion circuit. The conduction angle is in the range between 0 degree and 360 degree. For example, the conduction angle is 0 degree. The lower arm switch Ssr1 of the second phase conversion circuit is conducted at the same time with the first main switch S3 and the second main switch S4 of the second phase conversion circuit. The lower arm switch Ssr2 of the second phase conversion circuit is conducted at the same time with the first main switch S5 and the second main switch S6 of the third phase conversion circuit. The lower arm switch Ssr3 of the third phase conversion circuit is conducted at the same time with the first main switch S7 and the second main switch S8 of the fourth phase conversion circuit. The lower arm switch Ssr4 of the fourth phase conversion circuit is conducted at the same time with the first main switch S1 and the second main switch S2 of the first phase conversion circuit.

In case that the input side of the power converter 8 comprises the first positive terminal V1+ and the first negative terminal V1− and the output side of the power converter 8 comprises the second positive terminal V2+ and the second negative terminal V2−, the operations of the power converter 8 are similar to those of the power converter 1 of the first embodiment. In addition, the operations of each phase conversion circuit of the power converter 8 are similar to those of each phase conversion circuit of the power converter 1. If the magnitude of the output voltage from the power converter 8 is lower than the set voltage value because the input voltage declines and the duty cycles of the first main switch and the second main switch of each phase conversion circuit are equal to or close to 25% (i.e., 100/4=25%), four boost circuits are formed by the four phase conversion circuits to increase the magnitude of the output voltage. That is, a first boost circuit is defined by the inductor L1 and the bridge arm circuit 3 of the first phase conversion circuit collaboratively, a second boost circuit is defined by the inductor L2 and the bridge arm circuit 4 of the second phase conversion circuit collaboratively, a third boost circuit is defined by the inductor L3 and the bridge arm circuit 9 of the third phase conversion circuit collaboratively, and a fourth boost circuit is defined by the inductor L4 and the bridge arm circuit 10 of the fourth phase conversion circuit collaboratively. Consequently, after the input voltage declines, the output voltage is maintained at the set voltage value within a holding time period.

In case that the output side of the power converter 8 comprises the first positive terminal V1+ and the first negative terminal V1− and the input side of the power converter 8 comprises the second positive terminal V2+ and the second negative terminal V2−, the operations of the power converter 8 are similar to those of the power converter 7 of the second embodiment. In addition, the operations of each phase conversion circuit of the power converter 8 are similar to those of each phase conversion circuit of the power converter 7. In case that the output voltage of the power converter 8 is started, the duty cycle of the upper arm switch within the switching period of each phase conversion circuit is gradually increased under control of the control circuit 2. Consequently, the function of soft-starting the output voltage of the power converter 8 is achieved. In case that the input voltage of the power converter 8 is too high, the magnitude of the output voltage may exceed the set voltage value. If the duty cycles of the first main switch and the second main switch of each phase conversion circuit are equal to or close to the maximum value (e.g., 50%), the upper arm switch of each phase conversion circuit is ejected from the normally on state and the lower arm switch of each phase conversion circuit is ejected from the normally off state under control of the control circuit 2. That is, the upper arm switch of each phase conversion circuit is switched to the off state, and the lower arm switch of each phase conversion circuit is switched to the on state. Consequently, the magnitude of the output voltage is maintained at the fixed set voltage value.

Figure 9A:
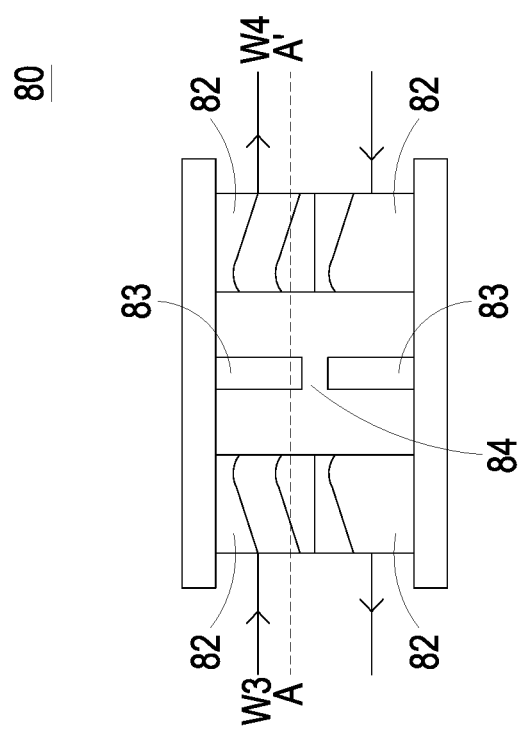
FIG. 9A is a schematic structure of a magnetic module for defining the inductors L1, L2, L3 and L4 of the power converter according to the third embodiment of the present disclosure.
Figure 9B:
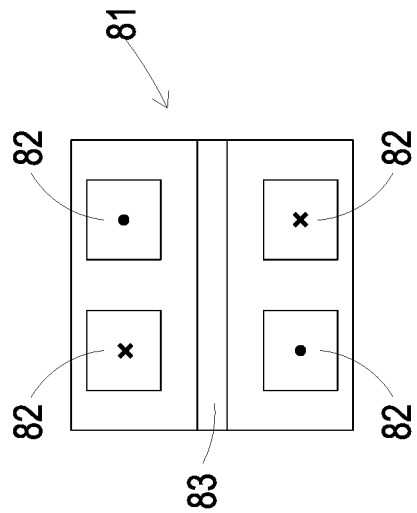
FIG. 9B is a schematic cross-sectional view illustrating the magnetic module as shown in FIG. 9A and taken along the line A-A'.

FIG. 9A is a schematic structure of a magnetic module for defining the inductors L1, L2, L3 and L4 of the power converter according to the third embodiment of the present disclosure. FIG. 9B is a schematic cross-sectional view illustrating the magnetic module as shown in FIG. 9A and taken along the line A-A'. The inductor L1 of the first phase conversion circuit, the inductor L2 of the second phase conversion circuit, the inductor L3 of the third phase conversion circuit and the inductor L4 of the fourth phase conversion circuit are coupled together as a magnetic module 80 according to a magnetic integration technology. As shown FIGS. 9A and 9B, the magnetic module 80 of the power converter 8 comprises a magnetic core 81, a first winding assembly (not shown), a second winding assembly (not shown), a third winding assembly W3 and a fourth winding assembly W4. The magnetic core 81 comprises four lateral legs 82 and a middle leg 83. The middle leg 83 is arranged between the four lateral legs 82. The middle leg 83 has a first air gap 84. Each lateral leg 82 has a second air gap. The length of the second air gap is smaller than or equal to the length of the first air gap 83. In some embodiments, the second air gap is close to zero. The first winding assembly (not shown), the second winding assembly (not shown), the third winding assembly W3 and the fourth winding assembly W4 are wound around the corresponding lateral legs 82. Consequently, the inductors L1, L2, L3 and L4 are defined by the four winding assemblies and the magnetic core 81 collaboratively.

In an embodiment, the cross section areas of all lateral legs 82 are equal, and the distance between each lateral leg 82 and the middle leg 83 is equal. That is, the four lateral legs 82 are symmetric with respect to the middle leg 83. Moreover, the distance between every two adjacent lateral legs 82 is equal. The turn numbers of all winding assemblies are equal. The method of forming the winding assemblies is not restricted as long as the DC magnetic fluxes of the middle leg 83 are superimposed and the AC magnetic fluxes are offset. Consequently, the ripple currents of the winding assemblies are reduced. In case that the duty cycles of the first main switch and the second main switch of each phase conversion circuit are 25%, the currents flowing through the winding assemblies have no ripples. Moreover, the directions of the AC magnetic fluxes of every two adjacent winding assemblies (e.g., the third winding assembly W3 and the fourth winding assembly W4) are opposite. As shown in FIG. 9B, the symbols "X" and "•" indicate two opposite directions. Due to the structure of the magnetic core 81, the density of the AC magnetic flux in the substrate is reduced and the core loss is reduced. Consequently, the thickness of the magnetic core 81 may be further reduced.

From the above description, the power converter comprises N phase conversion circuits in cascade connection. In the above embodiments, the power converter comprises two phase conversion circuits or four phase conversion circuits. It is noted that the number of the phase conversion circuits in the power converter is not restricted. The duty cycle of the first main switch of each phase conversion circuit and the duty cycle of the first main switch of the adjacent phase conversion circuit are equal. The phase difference between a driving signal of the first main switch of each phase conversion circuit and a driving signal of the first main switch of the adjacent phase conversion circuit is 360/N degree.

Figure 10:
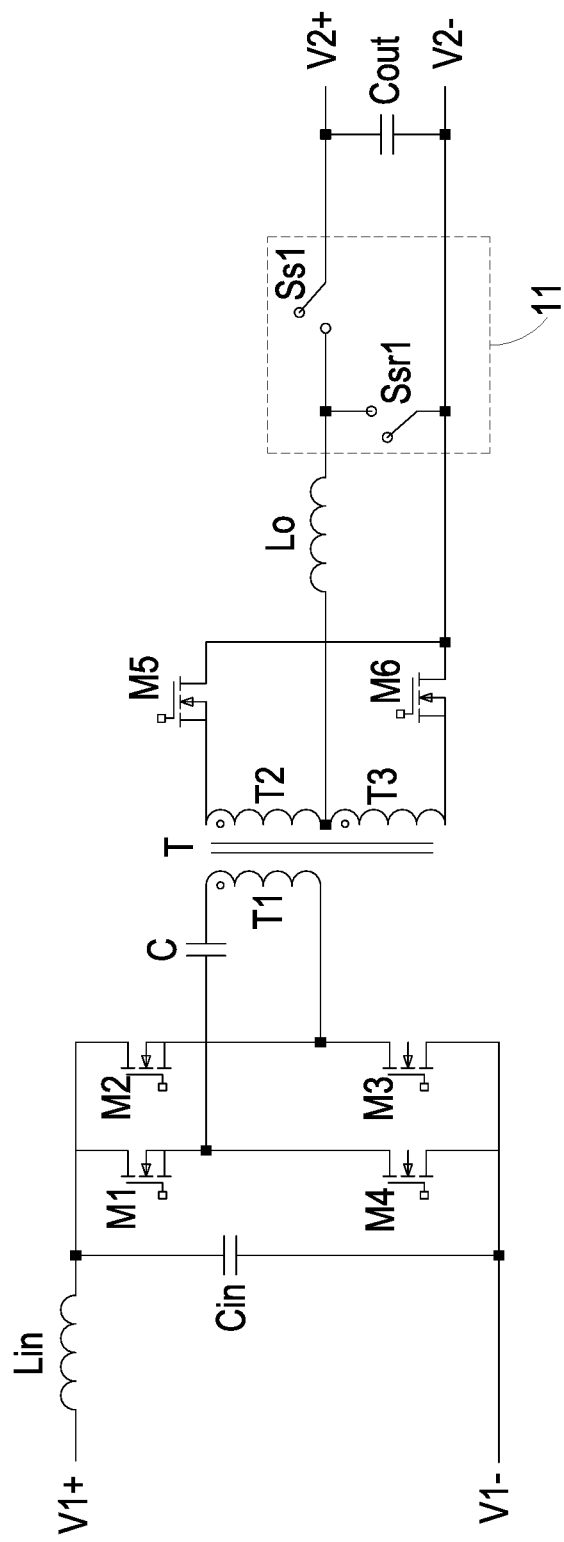
FIG. 10 is a schematic circuit diagram illustrating a power converter according to a fourth embodiment of the present disclosure.

It is noted that numerous modifications and alterations may be made while retaining the teachings of the disclosure. For example, the bridge arm circuit of the present disclosure and the conventional full-bridge hard switching circuit may be combined as another power converter. FIG. 10 is a schematic circuit diagram illustrating a power converter according to a fourth embodiment of the present disclosure. In this embodiment, the power converter comprises a full-bridge hard switching circuit and two phase conversion circuits. The output terminal of the full-bridge hard switching circuit is connected with a bridge arm circuit 11.

In an embodiment, the input side of the power converter comprises the first positive terminal V1+ and the first negative terminal V1−, and the output side of the power converter comprises the second positive terminal V2+ and the second negative terminal V2−. If the output voltage is maintained at the set voltage value and the duty cycles of the main switches M1, M2, M3 and M4 are lower than 50%, the upper arm switch Ss1 is in the normally on state and the lower arm switch Ssr1 is in the normally off state. If the output voltage is unable to be maintained at the set voltage value and the duty cycles of the main switches M1, M2, M3 and M4 are equal to or close to 50%, the upper arm switch Ss1 is ejected from the normally on state and the lower arm switch Ssr1 is ejected from the normally off state. The lower arm switch Ssr1 is conducted synchronously with the main switches M1 and M2. The conduction angle is in the range between 0 degree and 360 degree. For example, the conduction angle is 0 degree. The off state of the lower arm switch Ssr1 is controlled by the control circuit according to the detected output voltage. The on/off states of the upper arm switch Ss1 and the on/off states of the corresponding lower arm switch Ssr1 are complementary to each other.

In an embodiment, the output side of the power converter comprises the first positive terminal V1+ and the first negative terminal V1−, and the input side of the power converter comprises the second positive terminal V2+ and the second negative terminal V2−. If the duty cycles of the main switches M1, M2, M3 and M4 are equal to or close to 50%, the duty cycles of the upper arm switch Ss1 within the switching period is gradually increased. Consequently, the function of soft-starting the output voltage of the power converter is achieved. The operations are similar to those of the above embodiments, and are not redundantly described herein. In case that the input voltage of the power converter is too high, the magnitude of the output voltage may exceed the set voltage value. If the duty cycles of the main switches are equal to or close to the maximum value (e.g., 50%), the upper arm switch is ejected from the normally on state and the lower arm switch is ejected from the normally off state under control of the control circuit. That is, the upper arm switch is switched to the off state, and the lower arm switch is switched to the on state. Consequently, the magnitude of the output voltage is maintained at the fixed set voltage value.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:
a first positive terminal;
a first negative terminal;
a second positive terminal;
a second negative terminal connected with the first negative terminal;
a first capacitor, wherein a first terminal of the first capacitor is electrically connected with the second positive terminal, and a second terminal of the first capacitor is electrically connected with the second negative terminal;
N phase conversion circuits in cascade connection, wherein N is a positive integer equal to or greater than 2, and each of the N phase conversion circuits comprises:
a first main switch, wherein a first terminal of the first main switch is electrically connected with the first positive terminal;
a second main switch comprising a first terminal and a second terminal;
a second capacitor, wherein a first terminal of the second capacitor is electrically connected with a second terminal of the first main switch, and a second terminal of the second capacitor is electrically connected with the second terminal of the second main switch;
a freewheeling switch electrically connected between the second terminal of the second main switch and the second terminal of the first capacitor;
an inductor, wherein a first terminal of the inductor is electrically connected with the second terminal of the second main switch; and a bridge arm circuit electrically connected between the first capacitor and the inductor, wherein the bridge arm circuit comprises an upper arm switch and a lower arm switch, the upper arm switch is electrically connected between a second terminal of the inductor and the first terminal of the first capacitor, and the lower arm switch is electrically connected between the second terminal of the inductor and the second terminal of the first capacitor; and
a control circuit configured to control operations of the first main switch, the second main switch, the freewheeling switch and the bridge arm circuit of each phase conversion circuit,
wherein a first terminal of the second main switch of each phase conversion circuit is electrically connected with the second terminal of the first main switch of an adjacent phase conversion circuit of the N phase conversion circuits.

2. The power converter according to claim 1, wherein an input side of the power converter comprises the first positive terminal and the first negative terminal and an output side of the power converter comprises the second positive terminal and the second negative terminal, or the output side of the power converter comprises the first positive terminal and the first negative terminal and the input side of the power converter comprises the second positive terminal and the second negative terminal, wherein duty cycles of the first main switch and the second main switch of each phase conversion circuit are adjustable.

3. The power converter according to claim 2, wherein the on/off states of the first main switch of each phase conversion circuit and the on/off states of the second main switch of the corresponding phase conversion circuit are identical to each other under control of the control circuit, the on/off states of the freewheeling switch of each phase conversion circuit and the on/off states of the first main switch of the corresponding phase conversion circuit are complementary to each other under control of the control circuit, the on/off states of the upper arm switch of each phase conversion circuit and the on/off states of the lower arm switch of the corresponding phase conversion circuit are complementary to each other under control of the control circuit.

4. The power converter according to claim 3, wherein the lower arm switch of each phase conversion circuit and the first main switch of the adjacent phase conversion circuit are configured to synchronously turn on, and a conduction angle is in a range between 0 degree and 360 degree.

5. The power converter according to claim 3, wherein when a magnitude of an output voltage from the power converter is equal to a set voltage value and the duty cycles of the first main switch and the second main switch of each phase conversion circuit are lower than (100/N) %, the upper arm switch of each phase conversion circuit is in a normally on state and the lower arm switch of each phase conversion circuit is in a normally off state under control of the control circuit.

6. The power converter according to claim 3, wherein the input side of the power converter comprises the first positive terminal and the first negative terminal, and the output side of the power converter comprises the second positive terminal and the second negative terminal, wherein when a magnitude of an output voltage from the power converter is lower than a set voltage value and the duty cycles of the first main switch and the second main switch of each phase conversion circuit are equal to (100/N) %, the upper arm switch of each phase conversion circuit is ejected from a normally on state and the lower arm switch of each phase conversion circuit is ejected from a normally off state under control of the control circuit, so that the magnitude of the output voltage is increased and maintained at the set voltage value.

7. The power converter according to claim 3, wherein the output side of the power converter comprises the first positive terminal and the first negative terminal, and the input side of the power converter comprises the second positive terminal and the second negative terminal, wherein when a magnitude of an output voltage from the power converter is lower than a set voltage value and the duty cycles of the first main switch and the second main switch of each phase conversion circuit are equal to (100/N) %, the duty cycle of the upper arm switch of each phase conversion circuit is gradually increased.

8. The power converter according to claim 3, wherein the output side of the power converter comprises the first positive terminal and the first negative terminal, and the input side of the power converter comprises the second positive terminal and the second negative terminal, wherein when a magnitude of an output voltage exceeds a set voltage value and the duty cycles of the first main switch and the second main switch of each phase conversion circuit are equal to (100/N) %, the upper arm switch of each phase conversion circuit is ejected from a normally on state and the lower arm switch of each phase conversion circuit is ejected from a normally off state under control of the control circuit, so that the magnitude of the output voltage is decreased and maintained at the set voltage value.

9. The power converter according to claim 3, wherein a phase difference between a driving signal of the first main switch of each phase conversion circuit and a driving signal of the first main switch of the adjacent phase conversion circuit is 360/N degree under control of the control circuit, and a phase difference between a driving signal of the upper arm switch of each phase conversion circuit and a driving signal of the upper arm switch of the adjacent phase conversion circuit is 360/N degree under control of the control circuit.

10. The power converter according to claim 2, wherein a gain value of the power converter is equal to D1/(N×D2), wherein D1 is a duty cycle of the first main switch of each phase conversion circuit, and D2 is a duty cycle of the upper arm switch of each phase conversion circuit.

11. The power converter according to claim 1, wherein N is 2, and the N phase conversion circuits comprise a first phase conversion circuit and a second phase conversion circuit, wherein the first terminal of the second main switch of the first phase conversion circuit is electrically connected with the second terminal of the first main switch of the second phase conversion circuit.

12. The power converter according to claim 11, wherein the first main switch and the second main switch of the second phase conversion circuit and the lower arm switch of the first phase conversion circuit are synchronously conducted under control of the control circuit, and wherein the first main switch and the second main switch of the first phase conversion circuit and the lower arm switch of the second phase conversion circuit are synchronously conducted under control of the control circuit, wherein a conduction angle is in a range between 0 degree and 360 degree.

13. The power converter according to claim 11, wherein a phase difference between a driving signal of the first main switch of the first phase conversion circuit and a driving signal of the first main switch of the second phase conversion circuit is 180 degree, wherein a duty cycle of the lower arm switch of the first phase conversion circuit and a duty cycle of the lower arm switch of the second phase conversion circuit are equal, and a phase difference between a driving signal of the lower arm switch of the first phase conversion circuit and a driving signal of the lower arm switch of the second phase conversion circuit is 180 degree.

14. The power converter according to claim 11, wherein the inductor of the first phase conversion circuit and the inductor of the second phase conversion circuit are coupled as a magnetic module, wherein the magnetic module comprises:
    a magnetic core comprising a first lateral leg, a second lateral leg and a middle leg, wherein the middle leg is arranged between the first lateral leg and the second lateral leg, and the middle leg has a first air gap;
    a first winding assembly wound around the first lateral leg, wherein the inductor of the first phase conversion circuit is defined by the first winding assembly and the magnetic core collaboratively; and
    a second winding assembly wound around the second lateral leg, wherein the inductor of the second phase conversion circuit is defined by the second winding assembly and the magnetic core collaboratively,
    wherein the inductor of the first phase conversion circuit and the inductor of the second phase conversion circuit are coupled with each other, so that DC magnetic fluxes of the middle leg are superimposed, and AC magnetic fluxes of the middle leg are offset.

15. The power converter according to claim 14, wherein each of the first lateral leg and the second lateral leg has a second air gap, wherein the second air gap is smaller than or equal to the first air gap.

16. The power converter according to claim 1, wherein N is 4, the N phase conversion circuits comprise a first phase conversion circuit, a second phase conversion circuit, a third phase conversion circuit and a fourth phase conversion circuit, wherein the first terminal of the second main switch of the first phase conversion circuit is electrically connected with the second terminal of the first main switch of the second phase conversion circuit, the first terminal of the second main switch of the second phase conversion circuit is electrically connected with the second terminal of the first main switch of the third phase conversion circuit, the first terminal of the second main switch of the third phase conversion circuit is electrically connected with the second terminal of the first main switch of the fourth phase conversion circuit, and the first terminal of the second main switch of the fourth phase conversion circuit is electrically connected with the second terminal of the first main switch of the first phase conversion circuit.

17. The power converter according to claim 16, wherein the first main switch and the second main switch of the second phase conversion circuit and the lower arm switch of the first phase conversion circuit are synchronously conducted under control of the control circuit, wherein the first main switch and the second main switch of the third phase conversion circuit and the lower arm switch of the second phase conversion circuit are synchronously conducted under control of the control circuit, wherein the first main switch and the second main switch of the fourth phase conversion circuit and the lower arm switch of the third phase conversion circuit are synchronously conducted under control of the control circuit, wherein the first main switch and the second main switch of the first phase conversion circuit and the lower arm switch of the fourth phase conversion circuit are synchronously conducted under control of the control circuit, wherein a conduction angle is in a range between 0 degree and 360 degree.

18. The power converter according to claim 17, wherein a phase difference between a driving signal of the first main switch of the first phase conversion circuit and a driving signal of the first main switch of the second phase conversion circuit is 90 degree, wherein a phase difference between a driving signal of the first main switch of the second phase conversion circuit and a driving signal of the first main switch of the third phase conversion circuit is 90 degree, wherein a phase difference between a driving signal of the first main switch of the third phase conversion circuit and a driving signal of the first main switch of the fourth phase conversion circuit is 90 degree, wherein a phase difference between a driving signal of the first main switch of the fourth phase conversion circuit and a driving signal of the first main switch of the first phase conversion circuit is 90 degree.

19. The power converter according to claim 16, wherein the inductor of the first phase conversion circuit, the inductor of the second phase conversion circuit, the inductor of the third phase conversion circuit and the inductor of the fourth phase conversion circuit are coupled as a magnetic module, wherein the magnetic module comprises:
   a magnetic core comprising a first lateral leg, a second lateral leg, a third lateral leg, a fourth lateral leg and a middle leg, wherein the middle leg is arranged between the first lateral leg, the second lateral leg, the third lateral leg and the fourth lateral leg, and the middle leg has a first air gap;
   a first winding assembly wound around the first lateral leg, wherein the inductor of the first phase conversion circuit is defined by the first winding assembly and the magnetic core collaboratively;
   a second winding assembly wound around the second lateral leg, wherein the inductor of the second phase conversion circuit is defined by the second winding assembly and the magnetic core collaboratively;
   a third winding assembly wound around the third lateral leg, wherein the inductor of the third phase conversion circuit is defined by the third winding assembly and the magnetic core collaboratively; and
   a fourth winding assembly wound around the fourth lateral leg, wherein the inductor of the fourth phase conversion circuit is defined by the fourth winding assembly and the magnetic core collaboratively,
   wherein the directions of AC magnetic fluxes of every two adjacent ones of the first winding assembly, the second winding assembly, the third winding assembly and the fourth winding assembly are opposite,
   wherein the inductor of the first phase conversion circuit, the inductor of the second phase conversion circuit, the inductor of the third phase conversion circuit and the inductor of the fourth phase conversion circuit are coupled with each other, so that DC magnetic fluxes of the middle leg are superimposed, and AC magnetic fluxes of the middle leg are offset.

20. The power converter according to claim 19, wherein each of the first lateral leg, the second lateral leg, the third lateral leg and the fourth lateral leg has a second air gap, wherein the lengths of the second air gaps of the first lateral leg, the second lateral leg, the third lateral leg and the fourth lateral leg are equal to each other, and the length of the second air gap is smaller than or equal to the length of the first air gap.

* * * * *